Jan. 10, 1928.

E. C. KIRK 1,655,706

CABLE SPLICE

Filed April 25, 1923

Inventor

E. C. Kirk.

By Lacey & Lacey, Attorneys

Patented Jan. 10, 1928.

1,655,706

UNITED STATES PATENT OFFICE.

EDWARD C. KIRK, OF ST. ALBANS, WEST VIRGINIA, ASSIGNOR TO THE AMERICAN MINE DOOR CO., OF CANTON, OHIO, A CORPORATION OF OHIO.

CABLE SPLICE.

Application filed April 25, 1923. Serial No. 634,560.

This invention relates to that class of cable splices which consist of a sleeve of bendable metal adapted to be compressed about the ends of cable sections to firmly bind the same together and prevent separation thereof. The particular objects of my present invention are to provide a construction whereby the strands of the cable will be more effectually clamped than has heretofore been possible, and to avoid breaking or cutting of the cable strands against the edges of the splice. The invention is illustrated in the accompanying drawing and will be hereinafter fully set forth.

Figure 5:
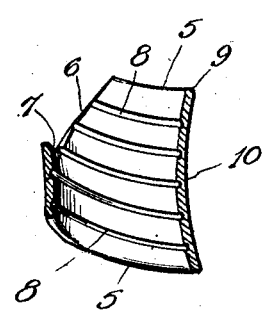
Fig. 5 is a section on the line 5—5 of Fig. 3.

In the drawing, the reference numeral 1 indicates sections of a cable consisting of a plurality of fine wires or strands, and 2 indicates insulation which is applied to the length of the said strands, while 3 indicates the splice applied to the overlapping ends of the strands of the cable. The splice is preferably formed from a flat diamond-shaped blank 4 having parallel side edges 5 and parallel end edges 6 which are disposed obliquely relative to the side edges, thereby producing oppositely tapered points 7. The blank is formed from stock having longitudinal grooves 8 in one side and in the forming of splices, the blank is so bent or rolled that the said grooves will lie on the inner surface of the same, as clearly shown in Figs. 2, 3 and 5. The side edges of the blank are made round or convex, as shown at 9, and the end edges may be likewise formed if desired, it being understood that the splice blanks are produced by cutting obliquely across the stock. The splice is supplied in a partly rolled or bent condition so that it may be easily assembled upon the cable and is subsequently fully compressed so as to bind closely about the strands of the cable. While the splice may be so bent or compressed about the cable as to present in the finished article a true cylindrical sleeve, it is preferable to perform the compressing operation in such manner that the intermediate portion of the sleeve will be compressed to a somewhat greater degree than the end portions thereof, thereby producing a slight dish, indicated at 10 in an exaggerated form.

Figure 1:
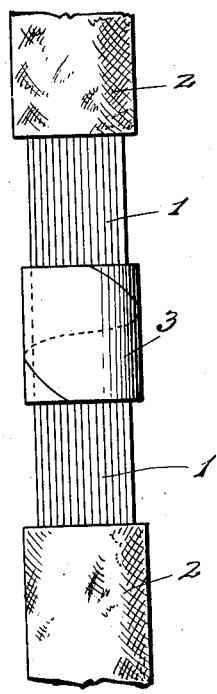
Figure 1 is an elevation of a portion of a spliced cable having my splice applied thereto.
Figure 2:
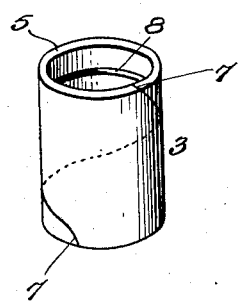
Fig. 2 is an enlarged perspective view of a complete splicing sleeve embodying my present invention.
Figure 3:
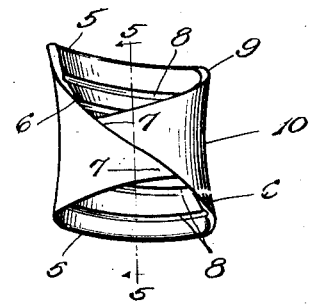
Fig. 3 is a similar view showing the device in a partly compressed condition.
Figure 4:
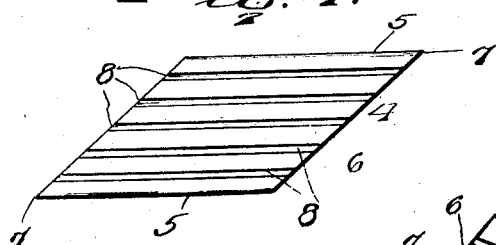
Fig. 4 is a plan view of the blank from which the device is formed.

In applying the splice to the meeting ends of the sections of a cable or to the ends of a break in a cable, the partly formed sleeve is fitted over one section of the cable and the ends of the strands in the two sections of the cable are then brought into overlapping relation, after which the sleeve is slid longitudinally of the cable so as to encircle the overlapped strands. Pressure is then applied through any convenient tool, or by hammering, so that the points 7 of the splice will ride upon the respectively opposed end edges 6 thereof and, when the splice has been fully compressed, a sleeve having square ends will result, as shown in Fig. 2. The oblique end edges of the blank will also lie in close contact and will define a helical joint substantially encircling the entire circumference of the cable whereby the cable will be very firmly held, and it will be readily noted that the grooves 8 on the inner surface of the splice will extend transversely of the cable and thereby obtain a very firm grip upon the strands, the several strands fitting into the grooves and forming locking engagement with the walls thereof, so that movement of the splice longitudinally of the cable will be prevented. The firm gripping action of the splice will also be enhanced by the dished form of the same and the convex formation of the side edges of the blank will avoid or eliminate from the ends of the completed splice all sharp corners which might cut through or break the wires composing the cable, as will be readily understood. After the splice is applied to the cable, an insulating sleeve or tape may be wrapped about the same between the existing sections of insulation 2 so that the cable may be permitted to lie upon the ground or be otherwise disposed without any liability of leakage to occur or short circuits being formed through contact with adjacent metallic objects. The spliced cable may be wound upon reels, as is customary, just as freely and easily as a new continuous cable.

Having thus described the invention, what is claimed as new is:

A cable splice comprising a longitudinally split sleeve formed of bendable sheet material and adapted to be compressed about cable strands, the diameter of the sleeve increasing from its center to its ends before being applied to a cable.

In testimony whereof I affix my signature.

EDWARD C. KIRK. [L. S.]